United States Patent
Haran

(10) Patent No.: US 10,261,312 B2
(45) Date of Patent: Apr. 16, 2019

(54) OPENING ANGLE STABILIZATION OF MICROMIRRORS THROUGH CURRENT DRIVE CONTROL

(71) Applicant: STMicroelectronics Ltd, Netanya (IL)

(72) Inventor: Elik Haran, Kfar Saba (IL)

(73) Assignee: STMicroelectronics Ltd, Netanya (IL)

( * ) Notice: Subject to any disclaimer, the term of this patent is extended or adjusted under 35 U.S.C. 154(b) by 0 days.

(21) Appl. No.: 15/589,542

(22) Filed: May 8, 2017

(65) Prior Publication Data

US 2018/0321483 A1    Nov. 8, 2018

(51) Int. Cl.
  *G02B 26/08*  (2006.01)
  *G02B 26/10*  (2006.01)
  *B81B 7/00*   (2006.01)

(52) U.S. Cl.
  CPC ........... *G02B 26/085* (2013.01); *B81B 7/008* (2013.01); *G02B 26/101* (2013.01); *G02B 26/105* (2013.01)

(58) Field of Classification Search
  CPC  G02B 26/0841; G02B 26/105; G02B 26/085; G02B 26/0858; G02B 26/0833; G02B 26/101
  See application file for complete search history.

(56) References Cited

U.S. PATENT DOCUMENTS

| | | | |
|---|---|---|---|
| 6,694,072 B1 * | 2/2004 | Neukermans | G02B 6/32 385/16 |
| 2008/0297868 A1 * | 12/2008 | Mizumoto | G02B 26/0858 359/199.1 |
| 2017/0131540 A1 * | 5/2017 | Kolodkin | G02B 26/0841 |

\* cited by examiner

*Primary Examiner* — Jennifer D. Carruth
(74) *Attorney, Agent, or Firm* — Crowe & Dunlevy

(57) ABSTRACT

An electronic device disclosed herein includes a mirror controller configured to generate a drive control signal, with a drive circuit configured to generate a drive signal for a movable mirror based upon the drive control signal. A sensing circuit is configured to sense the drive signal. The mirror controller is further configured to adjust the drive control signal as a function of the sensed drive signal.

21 Claims, 3 Drawing Sheets

OPENING ANGLE STABILIZATION OF MICROMIRRORS THROUGH CURRENT DRIVE CONTROL

TECHNICAL FIELD

This disclosure relates generally to the driving of micromirrors for image scanning, and, more particularly, to methods of driving said micromirrors that help maintain a consistent opening angle over time.

BACKGROUND

Certain devices such as wafer defect scanners, laser printers, document scanners, projectors and the like employ a collimated laser beam that scans across a flat surface in a straight line or curved path. These devices employ tilting mirrors to deflect the beam to perform the scanning. These tilting mirrors may be, or may include, Micro Electro Mechanical Systems ("MEMS") devices. The actuation of mirrors used in MEMS devices, referred to herein as MEMS mirrors, can be via the electromagnetic, electrostatic, piezoelectric, and thermoelectric effects, depending on application.

One type of common MEMS mirror includes a stator and a rotor, with the rotor or structures carried by the rotor being reflective. The stator and/or rotor are driven with a drive signal which results in the rotor oscillating with respect to the stator, thereby changing the angle of reflectance of an incident light beam on the rotor. By oscillating the rotor between two orientations, an opening angle of the mirror is defined, and scanning of the light beam across the flat surface is accomplished.

Precise control of the opening angle of the mirror so as to maintain the opening angle at a constant angle is desirable for the precise application in which such MEMS mirrors are used. However, current mirror driving techniques may not provide for a constant opening angle when operating conditions or properties of the circuitry change. Therefore, further development is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device disclosed herein includes a mirror controller configured to generate a drive control signal, with a drive circuit configured to generate a drive signal for a movable mirror based upon the drive control signal. A sensing circuit is configured to sense the drive signal. The mirror controller is further configured to adjust the drive control signal as a function of the sensed drive signal.

The mirror controller may adjust the drive control signal such that the sensed drive signal is equal to a desired drive signal. In addition, the drive signal may have a current value, and the sensing circuit may include a current to voltage converter configure to convert the current value of the drive signal to a voltage. An analog to digital converter may be configured to convert the voltage to a digital representation of the sensed drive signal, and the mirror controller may adjust the drive control signal as a function of the digital representation of the sensed drive signal.

The drive circuit may have a resistance that changes as a function of operating temperature of the electronic device. The drive signal may be generated as a function of the resistance. The mirror controller may adjust the drive control signal as a function of the sensed drive signal so as to maintain the drive signal at a desired condition regardless of the operating temperature of the electronic device.

The sensed drive signal may have a current value, and the mirror controller may adjust the drive control signal such that the drive circuit increases the current value of the drive signal to match a desired drive signal current value if the current value of the sensed drive signal is less than the desired drive signal current value.

The sensed drive signal may have a current value. The mirror controller may adjust the drive control signal such that the drive circuit decreases the current value of the drive signal to match a desired drive signal current value if the current value of the sensed drive signal is more than the desired drive signal current value.

The sensing circuit may be analog and operate in real time. In addition, the mirror controller may operate based upon a clock signal having a frequency that is higher than a frequency of oscillation of the movable mirror.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1A:
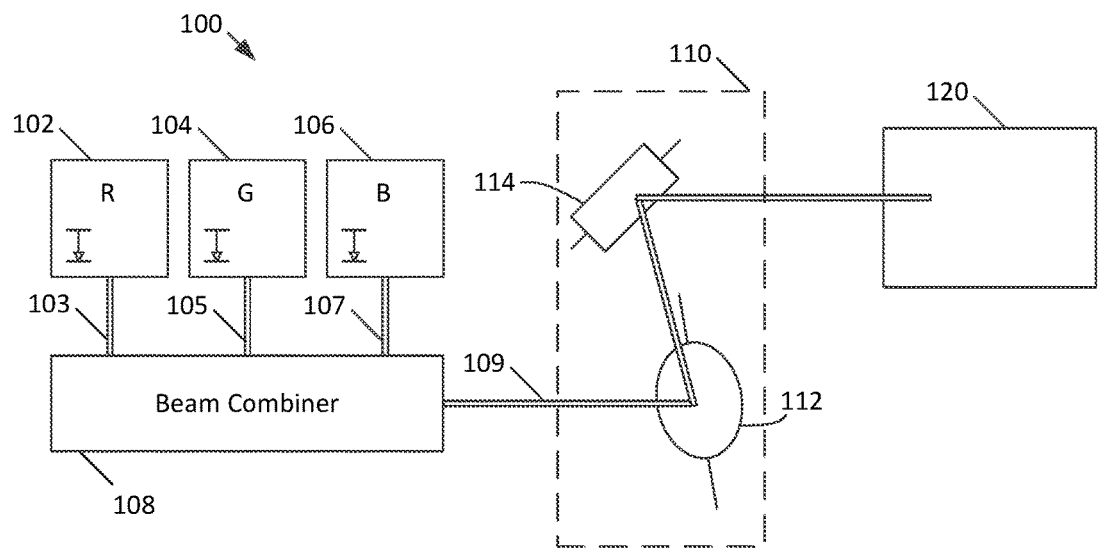
FIG. 1A is a block diagram of a laser scanning projector on which the control techniques and methods described herein may be performed.

Described herein with initial reference to FIG. 1A is a laser scanning device 100, such as may be used pico-projectors that are either standalone units or incorporated within other electronic devices such as smartphones. The laser scanning projector 100 includes a red laser 102, green laser 104, and blue laser 106. These lasers 102, 104, 106 in operation generate beams of collimated light 103, 105, 107 which are combined by a beam combiner 108 into an RGB laser or RGB beam of collimated light 109.

A mirror apparatus 110 receives the RGB laser 109 and reflects it onto a target 120. In greater detail, the mirror apparatus 110 includes a fast axis mirror 112 receiving the RGB laser 109 and reflecting it toward a slow axis mirror 114, which in turn reflects it onto the target 120. The fast axis mirror 112 is controlled to scan the RGB laser 109 between set travel limits for the fast axis, and the slow axis mirror 114 is controlled to scan the RGB laser 109 between set travel limits for the slow axis. The fast axis is typically a horizontal axis while the slow axis is typically the vertical axis, although in some cases the converse may be true. In some cases, a single biaxial mirror may instead be used to scan both the fast axis and flow axis.

Figure 1B:
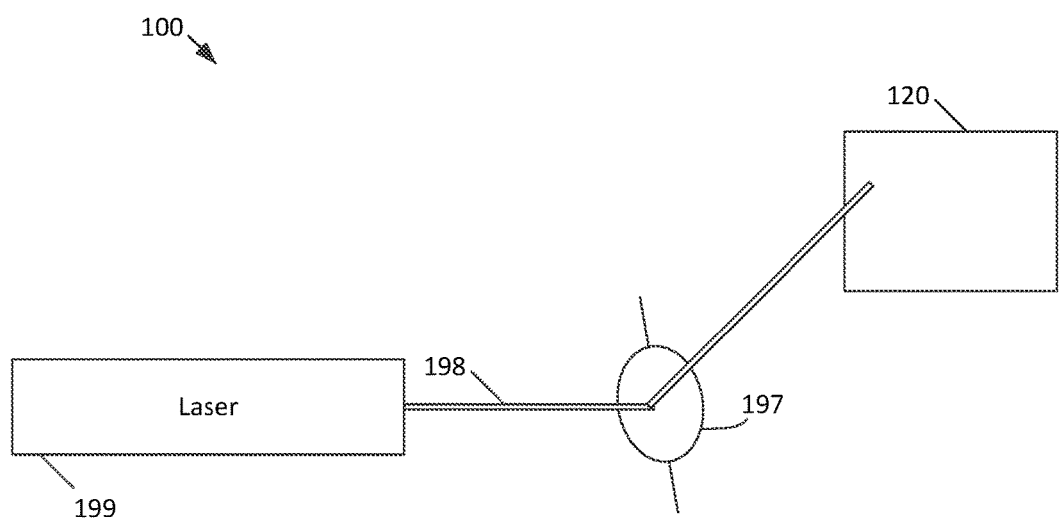
FIG. 1B is a block diagram of a scanner on which the control techniques and methods described herein may be performed.

In some cases, the laser scanning device 100 may be used in devices such as wafer defect scanners, laser printers, document scanners, projectors, and the like. In these instances, such as shown in FIG. 1B the laser scanning device 100 includes a single laser 199, such as an infrared laser, that emits a laser beam 198 toward a mirror 197, which in turn reflects the laser beam 198 onto the target 120. The mirror 197 may be biaxial in some cases, or in others, both a fast axis mirror and a slow axis mirror may be used.

Figure 2:
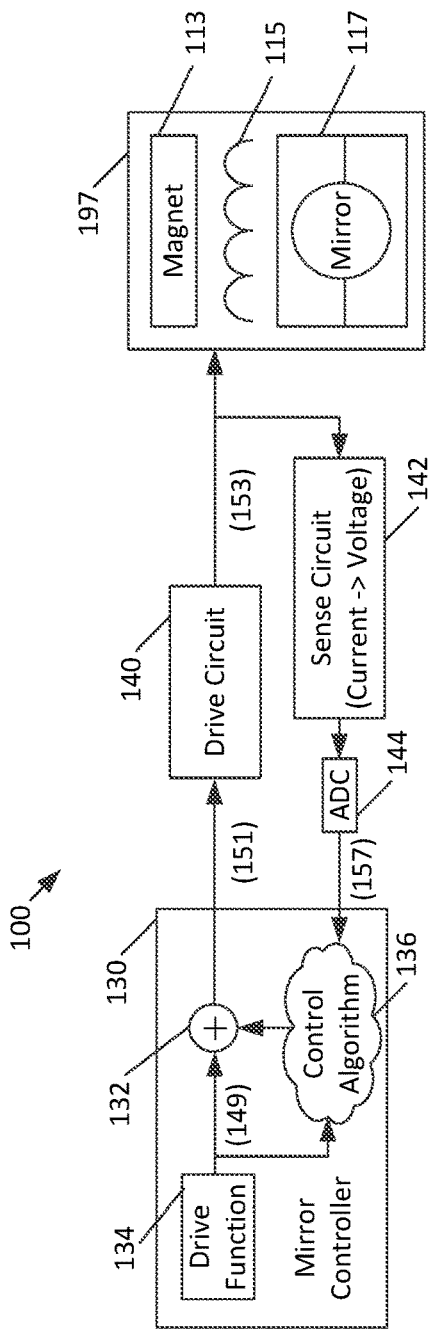
FIG. 2 is a further block diagram of the laser scanning projector of FIG. 1B in which the drive circuitry, mirror control circuitry, and current sensing circuitry is shown for the fast axis mirror.

Driving of mirrors such as the fast axis mirror 112 or slow axis mirror 114 (FIG. 1A), or the mirror 197 (FIG. 1B), is now described with further reference to FIG. 2. The mirror 197 here is electromagnetically driven and includes an oscillating reflective structure 117 that is caused to oscillate due to an electromagnetic force generated by cooperation of a magnet 113 and coil 115.

Mirror control circuitry 130 generates a drive control signal 151 for a drive circuit 140. The drive control signal 151 is a digital control signal representing a current value for the drive circuit 140 to generate. The drive circuit 140 generates a drive signal 153 for the mirror 197 that has a current value based upon the digital control signal 151.

As known from Ohms law, current is a function of voltage and resistance. As is also known, the resistance of electronic components changes with temperature. Therefore, the current of the drive signal 153 generated by the drive circuit 140 can vary with the temperature of related components. The opening angle of the mirror 197 is dependent, in part, on the current of the drive signal 153; therefore, the variances in the current of the drive signal 153 can lead to variances in the opening angle of the mirror 197. This is undesirable, as it could degrade performance of the application for which the laser scanning device 100 is used.

Therefore, as shown in FIG. 2, the laser scanning device 100 includes a sense circuit 142 that senses the current of the drive signal 153 and converts it to a voltage for use as feedback. An analog to digital converter 144 converts the voltage output by the sense circuit 142 to a digital representation 157. If the digital representation 157 indicates that the current of the drive signal 153 is lower than the expected or desired current, then the mirror controller 130 adjusts the digital control signal 151 such that the current of the drive signal 153 matches the expected current. If the digital representation 157 indicates that the current of the drive signal 153 is higher than the expected or desired current, then the mirror controller 130 adjusts the digital control signal 151 such that the current of the drive signal 153 matches the expected current. If the digital representation 157 indicates that the current of the drive signal 153 matches the expected or desired current, then the mirror controller 130 maintains the digital control signal 151 at the current level. Therefore, due to this feedback mechanism, the opening angle of the mirror 197 is unaffected by changes in temperature.

In some instances, the mirror controller generates an initial digital control signal 149 using a drive function 134. A control algorithm 136 receives the initial digital control signal 149 and the digital representation 157, and applies an adjustment to the initial digital control signal 149 at the summer 132 to produce the digital control signal 151. The control algorithm 136 may operate as described above, by applying a positive modifier to the initial digital control signal 149 where the digital representation 157 indicates that the current of the drive signal 153 is less than the expected current, and applying a negative modifier to the initial digital control signal 149 where the digital representation 157 indicates that the current of the drive signal 153 is more than the expected current.

Figure 3:
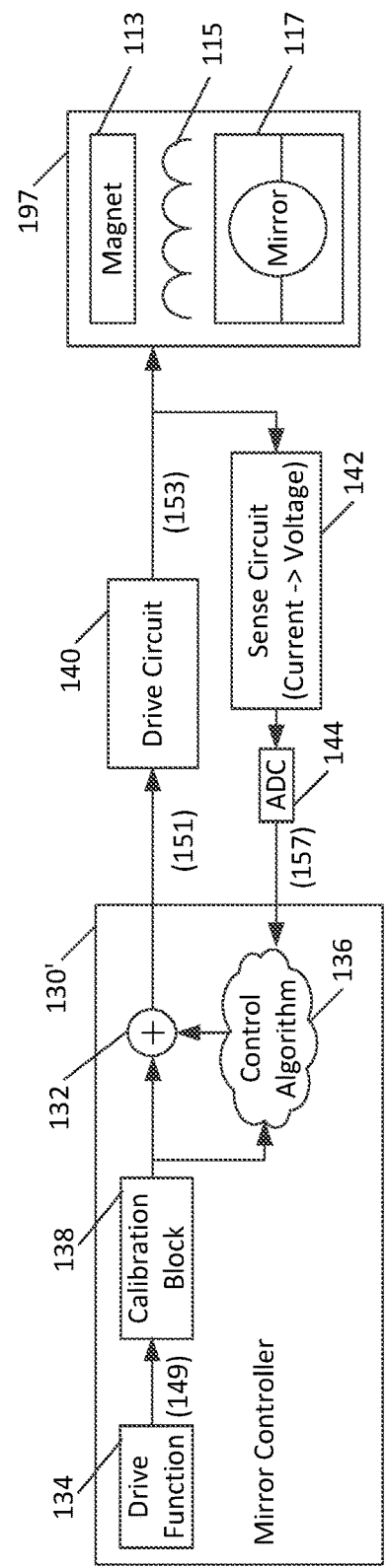
FIG. 3 is a further block diagram of another configuration of the laser scanning projector of FIG. 2 in which the mirror control circuitry includes a calibration block.

A calibration may be performed in some instances. As shown in FIG. 3, the mirror controller 130' may include a calibration block 138 that correlates the initial digital control signal 149 to a corresponding voltage, and correlates that corresponding voltage to an opening angle of the mirror 197. The control algorithm 136 may adjust the initial digital control signal 149 as a function of this correlation.

Figure 4:
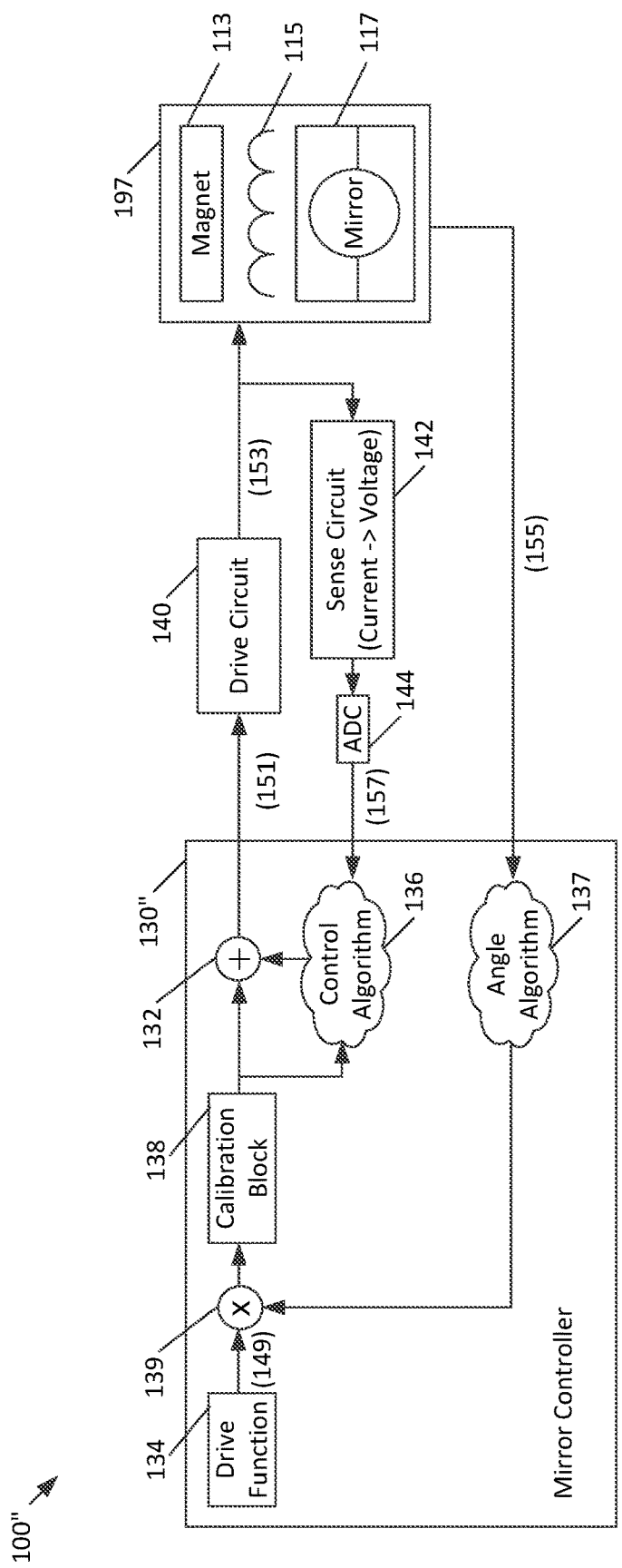
FIG. 4 is a further block diagram of another configuration of the laser scanning projector of FIG. 1B in which drive circuitry, mirror control circuitry, current sensing circuitry, and mirror angle sensing circuitry is shown for the fast axis mirror.

As shown in FIG. 4, in some instances, the laser scanning device 100" may include additional feedback mechanisms relative to the determination of the amplitude opening angle of the mirror 197. First, it should be remembered that the feedback loop formed by the sense circuit 142, ADC 144, control algorithm 136 and summer 132 may correct or adjust for electrical properties of the laser scanning device 100", such as a resistance that varies with respect to operating temperature.

Keeping that in mind, it should be noted that mechanical properties of the mirror 197 may also change, either with respect to temperature, air drag resistance, device age, or mechanical failure. Thus, the mirror controller 130" may execute an angle determination algorithm 137 for determining the opening angle of the mirror 197, and the angle detection algorithm 137 may then in turn adjust the initial digital control signal 149 as a function of the actual opening angle of the mirror 197, or may take another action (such as shutting off the laser). Thus, the feedback loop formed by the angle algorithm 137 and multiplier 139 may adjust for mechanical properties of the laser scanning device 100". Stated yet another day, the feedback loop formed by the angle algorithm 137 and multiplier 139 may adjust the initial digital control signal 149 itself, while the feedback looped formed by the sense circuit 142, ADC 144, control algorithm 136 and summer 132 may adjust the digital control signal 151 itself.

It should be understood that any of the components shown in FIGS. 2-4 may be integrated within an ASIC.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device, comprising:
   a mirror controller configured to generate a drive control signal;

a drive circuit configured to generate a drive signal for a movable mirror based upon the drive control signal to cause the movable mirror to oscillate between first and second predefined travel limits which define an opening angle of the movable mirror; and a sensing circuit configured to sense the drive signal;

wherein the mirror controller is further configured to adjust the drive control signal as a function of the sensed drive signal so as to adjust the opening angle to match a desired opening angle.

2. The electronic device of claim 1, wherein the mirror controller adjusts the drive control signal such that the sensed drive signal is equal to a desired drive signal.

3. The electronic device of claim 1, wherein the drive signal has a current; and wherein the sensing circuit comprises a current to voltage converter configure to convert the current of the drive signal to a voltage.

4. The electronic device of claim 3, further comprising an analog to digital converter configured to convert the voltage to a digital representation of the sensed drive signal; and wherein the mirror controller adjusts the drive control signal as a function of the digital representation of the sensed drive signal.

5. The electronic device of claim 1, wherein the drive circuit has a resistance that changes as a function of operating temperature of the electronic device; wherein the drive signal is generated as a function of the resistance; and wherein the mirror controller adjusts the drive control signal as a function of the sensed drive signal so as to maintain the drive signal at a desired condition independent of the operating temperature of the electronic device.

6. The electronic device of claim 1, wherein the sensed drive signal has a current value; wherein the mirror controller adjusts the drive control signal such that the drive circuit increases the current value of the drive signal to match a desired drive signal current value if the current value of the sensed drive signal is less than the desired drive signal current value.

7. The electronic device of claim 1, wherein the sensed drive signal has a current value; wherein the mirror controller adjusts the drive control signal such that the drive circuit decreases the current value of the drive signal to match a desired drive signal current value if the current value of the sensed drive signal is more than the desired drive signal current value.

8. The electronic device of claim 1, wherein the sensing circuit is analog and operates in real time; and wherein the mirror controller operates based upon a clock signal having a frequency that is higher than a frequency of oscillation of the movable mirror.

9. The electronic device of claim 1, wherein a rate of oscillation of the movable mirror between the first and second predefined travel limits serves to scan a laser impinging upon the movable mirror across a target at a rate sufficient so as to produce a video image for viewing by a human eye.

10. A portable electronic device, comprising:
an oscillating MEMS mirror that is electromagnetically operated;
a mirror controller configured to generate a drive control signal;
a drive circuit configured to generate a drive current for the oscillating MEMS mirror based upon the drive control signal to cause the oscillating MEMS mirror oscillate between first and second predefined travel limits which define an opening angle of the oscillating MEMS mirror;

a sensing circuit configured to sense the drive current; and wherein the mirror controller is further configured to:
in a calibration mode, correlate drive current to the opening angle of the oscillating MEMS mirror; and
in a normal operation mode, adjust the drive control signal based upon the sensed drive current so that the opening angle of the oscillating MEMS mirror matches an expected opening angle of the oscillating MEMS mirror.

11. The portable electronic device of claim 10, wherein the mirror controller, in the normal operation mode, adjusts the drive control signal such that the drive current increases if the opening angle is less than the expected opening angle.

12. The portable electronic device of claim 10, wherein the mirror controller, in the normal operation mode, adjusts the drive control signal such that the drive current decreases if the opening angle is more than the expected opening angle.

13. The portable electronic device of claim 10, wherein the portable electronic device is configured to define a picoprojector, smartphone, or smartwatch.

14. A method, comprising:
driving a movable MEMS mirror with a drive current to cause the movable MEMS mirror to oscillate between first and second predefined travel limits which define an opening angle of the movable MEMS mirror;
sensing the drive current; and
where the drive current is not equal to a desired drive current, adjusting the driving of the movable MEMS mirror such that the drive current is equal to the desired drive current to thereby adjust the opening angle to match a desired opening angle.

15. The method of claim 14, wherein driving the movable MEMS mirror with a drive current comprises generating a control signal for a driving circuit that controls generation of the drive current by the driving circuit.

16. The method of claim 15, wherein adjusting the driving of the movable MEMS mirror comprises adjusting the control signal for the driving circuit.

17. The method of claim 15, wherein adjusting the driving of the movable MEMS mirror comprises:
modifying the control signal such that the drive current increases, where the sensed drive current is less than a desired drive current;
modifying the control signal such that the drive current decreases, where the sensed drive current is more than the desired drive current; and
maintaining the control signal at its current level where the sensed drive current is equal to the desired drive current.

18. An electronic device, comprising:
a mirror controller;
a drive circuit receiving input from the mirror controller and providing output to a movable mirror to cause the movable mirror to oscillate between first and second predefined travel limits which define an opening angle of the movable mirror;
a current to voltage converter having an input coupled to receive the output of the drive circuit; and
an analog to digital converter having an input coupled to receive output from the current to voltage converter and providing output to the mirror controller for use as feedback to cause the mirror controller to adjust the opening angle to match a desired opening angle.

19. The electronic device of claim 18, wherein the current to voltage converter is an analog device operating in real time; and wherein the drive circuit operates based upon a clock that is higher in frequency than an oscillation frequency of the movable mirror.

20. A method, comprising:
   driving a movable MEMS mirror with a drive current to cause the movable MEMS mirror to oscillate between first and second predefined travel limits which define an opening angle of the movable MEMS mirror;
   sensing the drive current;
   where the drive current is not equal to a desired drive current, adjusting the driving of the movable MEMS mirror such that the drive current is equal to the desired drive current to thereby adjust the opening angle such that the opening angle is intended to match a desired opening angle; and
   adjusting the desired drive current as a function of at least one mechanical property of the movable MEMS mirror.

21. The method of claim 20, wherein the at least one mechanical property of the movable MEMS mirror comprises whether the movable MEMS mirror has failed.

* * * * *